United States Patent
Brocker et al.

(10) Patent No.: US 9,810,128 B2
(45) Date of Patent: Nov. 7, 2017

(54) SECONDARY AIR PUMP ASSEMBLY

(71) Applicants: Andrew Brocker, Brighton, MI (US); James J. Daley, Jackson, MI (US)

(72) Inventors: Andrew Brocker, Brighton, MI (US); James J. Daley, Jackson, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/822,468

(22) Filed: Aug. 10, 2015

(65) Prior Publication Data
US 2017/0044959 A1 Feb. 16, 2017

(51) Int. Cl.
*F01N 3/00* (2006.01)
*F01N 3/32* (2006.01)
*F02M 35/10* (2006.01)
*F01N 11/00* (2006.01)

(52) U.S. Cl.
CPC .............. *F01N 3/32* (2013.01); *F01N 3/323* (2013.01); *F01N 11/00* (2013.01); *F02M 35/10144* (2013.01); *F02M 35/10222* (2013.01); *F01N 2560/025* (2013.01)

(58) Field of Classification Search
USPC ........ 60/280, 285, 287, 288, 289, 290, 291, 60/292, 293, 324, 609, 610, 611, 620; 123/559.1, 559.2, 565, 568.21, 568.22
See application file for complete search history.

(56) References Cited

U.S. PATENT DOCUMENTS

| | | | | |
|---|---|---|---|---|
| 4,083,183 | A * | 4/1978 | Yaegashi | F01N 3/22 123/586 |
| 4,194,477 | A | 3/1980 | Sugiyama | |
| 5,022,375 | A * | 6/1991 | Goto | F02B 33/44 123/564 |
| 5,404,717 | A * | 4/1995 | Nogi | F02N 11/00 123/179.18 |
| 5,427,079 | A * | 6/1995 | Andrepont, Jr. | F01N 3/20 123/561 |
| 5,499,502 | A | 3/1996 | Haniu et al. | |
| 5,544,483 | A | 8/1996 | Heuer | |
| 6,167,699 | B1 | 1/2001 | Johnston et al. | |
| 7,222,483 | B2 | 5/2007 | Oi et al. | |
| 8,690,727 | B2 * | 4/2014 | Venton-Walters | F16D 1/101 477/111 |
| 2006/0219231 | A1* | 10/2006 | Uchida | F01N 3/22 123/585 |
| 2007/0077138 | A1* | 4/2007 | Tsuzuki | F04D 29/188 415/55.1 |
| 2008/0073605 | A1* | 3/2008 | Ishigaki | F16K 1/36 251/12 |
| 2010/0236517 | A1* | 9/2010 | Hatamura | F01L 13/0026 123/299 |
| 2012/0240908 | A1 | 9/2012 | Kado et al. | |
| 2014/0060040 | A1 | 3/2014 | Zhang et al. | |

* cited by examiner

*Primary Examiner* — Binh Q Tran
(74) *Attorney, Agent, or Firm* — Ralph E Smith

(57) ABSTRACT

A secondary air pump assembly for a vehicle includes a housing having an air inlet and an air outlet, a pump disposed within the housing, a position assembly and a valve assembly. The position assembly is disposed within the housing and configured to monitor a speed of the pump. The valve assembly is configured to facilitate preventing a backflow of air into the housing. A secondary air system including the secondary air pump assembly is also provided.

10 Claims, 2 Drawing Sheets

SECONDARY AIR PUMP ASSEMBLY

FIELD

The present application relates generally to secondary air systems for a vehicle and, more particularly, to an air pump for a secondary air system of a vehicle.

BACKGROUND

Secondary air systems are utilized in vehicles to add oxygen to exhaust gases. Typically, secondary air systems operate by pumping fresh air into the exhaust by a simple electrical or mechanical air pump. In some vehicles, the secondary air system is generally used only at startup to help burn the rich air-to-fuel mixture needed to run a cold engine. Once the catalytic converter is at operational temperature, the secondary air system is shut down.

Secondary air systems are effective at reducing cold-start vehicle emissions. However, such conventional secondary air systems include multiple separate components such as a separate sensor, air pump, and check valve, which adds increased cost and complexity to the vehicle. Accordingly, while such conventional secondary air systems work for their intended purpose, it is desirable to provide an improved secondary air system.

SUMMARY

According to one aspect of the invention, a secondary air pump assembly for a vehicle is provided. In an exemplary implementation, the secondary air pump assembly includes a housing having an air inlet and an air outlet, a pump disposed within the housing, a position assembly disposed within the housing and configured to monitor a speed of the pump, and a valve assembly configured to facilitate preventing a backflow of air into the housing.

In addition to the foregoing, the secondary air pump assembly may include one or more of the following features: wherein the valve assembly is disposed within the housing; wherein the pump is a positive displacement pump; a motor assembly operably associated with the positive displacement pump, wherein the motor assembly is disposed within the housing and comprises a motor and a shaft; wherein the position assembly comprises a target wheel coupled to the shaft; wherein the position assembly comprises a hall-effect sensor and a target wheel having at least one permanent magnet; and wherein the valve assembly comprises a check valve disposed in the air outlet of the housing.

According to another aspect of the invention, a secondary air system for a vehicle is provided. In an exemplary implementation, the secondary air system includes an exhaust manifold configured to be coupled to an engine, an exhaust gas conduit coupled to the exhaust manifold, an air intake conduit configured to supply intake air to the engine, a secondary air intake conduit coupled to the air intake conduit, and a secondary air pump assembly fluidly coupled to the secondary air intake conduit. The secondary air pump assembly includes a housing having an air inlet and an air outlet, a pump disposed within the housing, a position assembly disposed within the housing and configured to monitor a speed of the pump, and a valve assembly configured to facilitate preventing a backflow into the housing.

In addition to the foregoing, the secondary air system may include one or more of the following: wherein the valve assembly is disposed within the housing; wherein the pump is a positive displacement pump; a motor assembly operably associated with the positive displacement pump, wherein the motor assembly is disposed within the housing and comprises a motor and a shaft; wherein the position assembly comprises a target wheel coupled to the shaft; wherein the position assembly comprises a hall-effect sensor and a target wheel having at least one permanent magnet; wherein the valve assembly comprises a check valve disposed in the air outlet of the housing; an O2 sensor disposed in the exhaust gas conduit; and a controller in signal communication with the secondary air pump assembly, the controller programmed to determine a mass air flow of the pump utilizing the position assembly.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
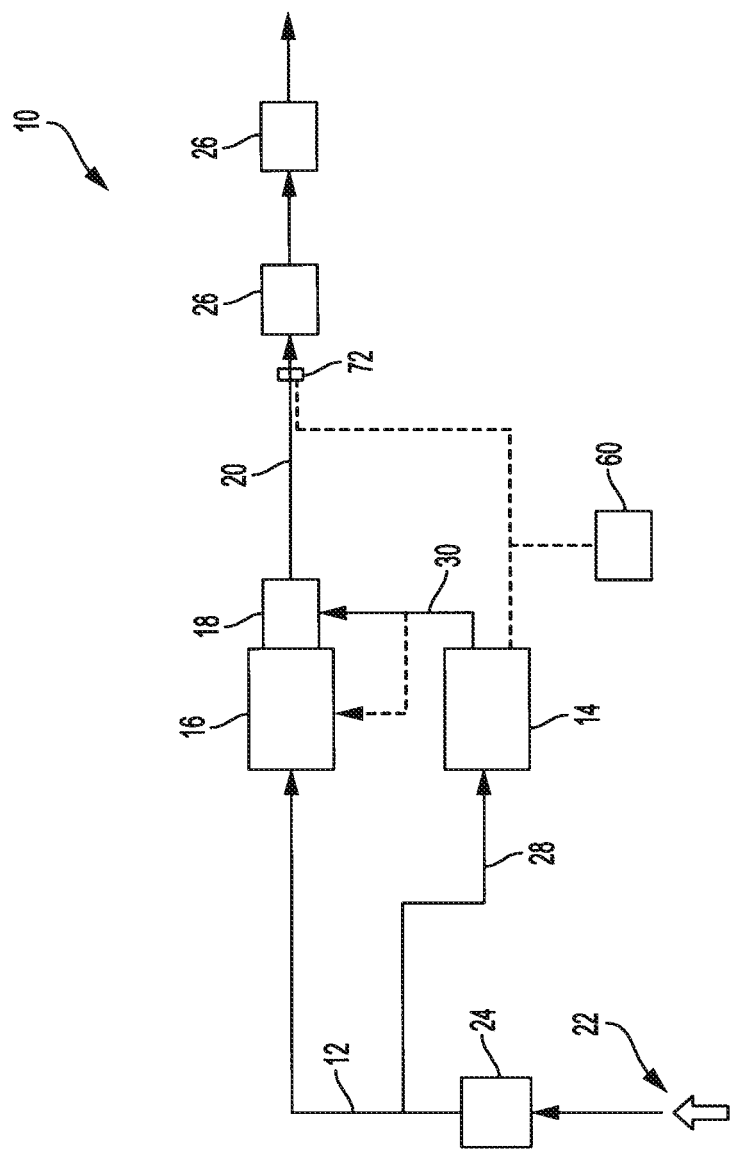
FIG. 1 is a schematic view of an exemplary secondary air system for a vehicle in accordance with the principles of the present disclosure.

With initial reference to FIG. 1, an exemplary secondary air system is illustrated and generally identified at reference numeral 10. Secondary air system 10 generally includes an air intake conduit 12, a secondary air pump assembly 14, an engine 16, an exhaust manifold 18, and an exhaust gas conduit 20. Air intake conduit 12 includes an air inlet 22 configured to receive fresh or recirculated air, and an air filter 24. Air intake conduit 12 is fluidly coupled to engine 16 and is configured to supply air to cylinders (not shown) of engine 16. The cylinders are connected to exhaust manifold 18, which supplies an exhaust gas from the cylinders to exhaust gas conduit 20. One or more exhaust after-treatment components 26 such as a catalytic converter are disposed within exhaust gas conduit 20 to treat the exhaust gas.

In an exemplary embodiment, secondary air pump assembly 14 is fluidly coupled to air intake conduit 12 via a secondary air intake conduit 28. Secondary air pump assembly 14 is configured to supply secondary air via a secondary air supply conduit 30 to an area proximate a cylinder exhaust valve such as exhaust manifold 18, a cylinder head (not shown), and/or engine block passages (not shown) of engine 16.

Figure 2:
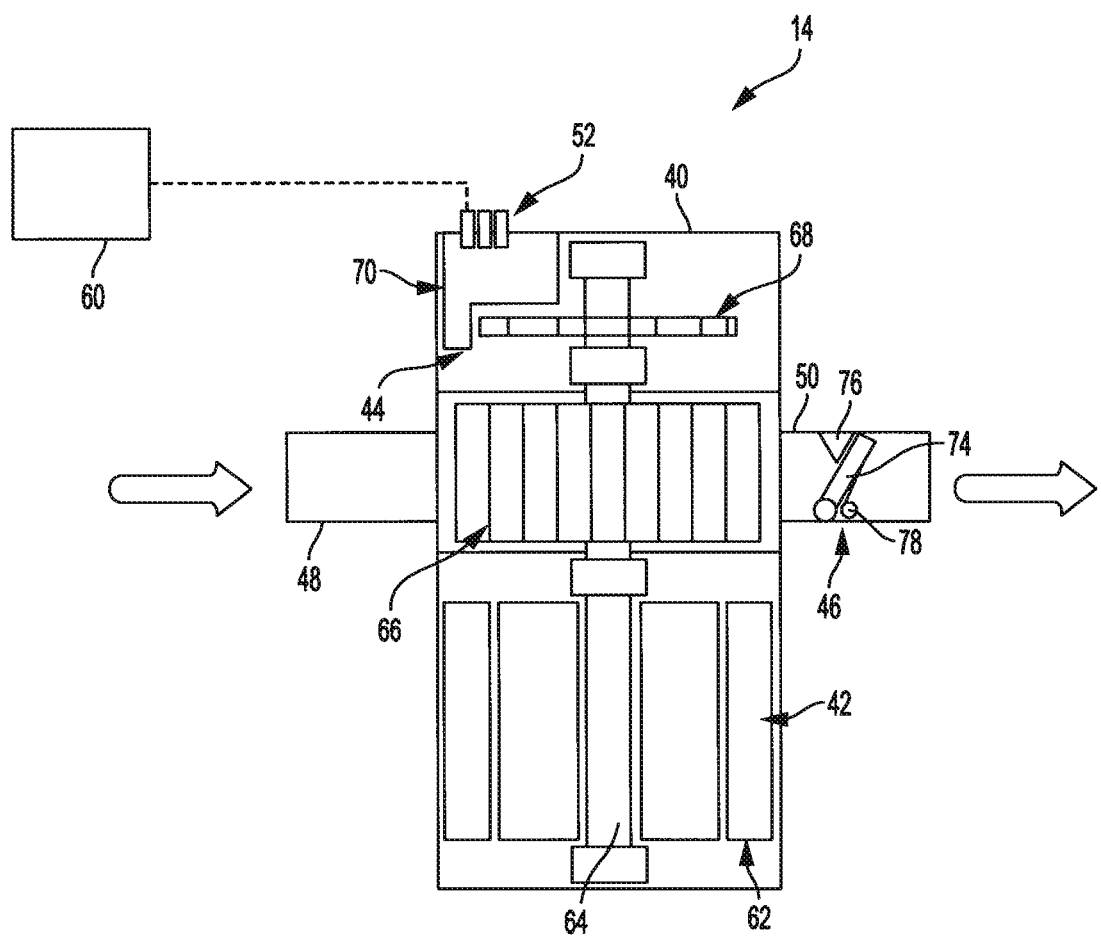
FIG. 2 is a schematic view of an exemplary secondary air pump of the system shown in FIG. 1 in accordance with the principles of the present disclosure.

FIG. 2 illustrates an exemplary embodiment of secondary air pump assembly 14 that generally includes a housing 40, a motor assembly 42, a position assembly 44, and a valve assembly 46. Housing 40 includes an air inlet 48, an air outlet 50, and a connector 52. Air inlet 48 is fluidly coupled to secondary air intake conduit 28 to receive air from intake conduit 12, and air outlet 50 is fluidly coupled to secondary air supply conduit 30 to supply secondary air to exhaust manifold 18 and/or the cylinder head. Connector 52 provides electrical and/or signal communication to pump assembly 14.

For example, as illustrated, pump assembly 14 is in electrical and signal communication with a controller 60. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Motor assembly 42 includes a motor 62, a shaft 64, and an impeller 66. In one embodiment, motor 62 is a brushless DC motor and/or a variable speed motor. Motor 62 is configured to rotate shaft 64, which in turn rotates impeller 66 coupled thereto. Rotation of impeller 66 draws secondary air into air inlet 48 and forces the secondary air out secondary air outlet 50.

In the exemplary embodiment, position assembly 44 includes a target wheel 68 and an angular position sensor 70. Target wheel 68 is coupled to motor shaft 64 and is configured to be rotated thereby. Angular position sensor 70 is disposed within housing 40 in proximity to target wheel 68 such that position sensor 70 can monitor a speed and a directional rotation (i.e., clockwise or counter-clockwise) of target wheel 68. In the illustrated embodiment, target wheel 68 includes one or more permanent magnets (not shown), and position sensor 70 is a hall-effect sensor, the combined operation of which is well known.

In the exemplary embodiment, pump assembly 14 is a positive displacement pump and supplies a fixed or substantially fixed volume of air. Accordingly, the mass air flow supplied by pump assembly 14 through secondary air outlet 50 may be subsequently calculated (e.g., by controller 60) using the impeller speed determined by position assembly 44. Accordingly, secondary air system 10 does not require a separate mass flow sensor that is typically present in conventional secondary air systems. Moreover, position assembly 44 is configured to determine if pump assembly 14 is operating in reverse (e.g., rotating counter-clockwise) such that air may be supplied back out through air inlet 48, which may indicate an air leak in secondary air system 10 upstream of secondary air pump assembly 14.

Further, exhaust gas conduit 20 may include one or more O2 sensors 72 disposed therein and configured to monitor the oxygen content of the exhaust gas flowing through conduit 20. As such, controller 60 can confirm secondary air is being introduced into exhaust gas conduit 20.

In the exemplary embodiment, valve assembly 46 is disposed downstream of impeller 66 within secondary air outlet 50 and is configured to prevent fluid flow from secondary air supply conduit 30 back through air outlet 50 into pump assembly 14. In the exemplary embodiment illustrated in FIG. 2, valve assembly 46 is a check valve having a flap 74 and a stop 76. Flap 74 is pivotally mounted within air outlet 50 and is biased toward stop 76 by a biasing mechanism 78 (e.g., a spring) to prevent backflow into pump assembly 14. When pump assembly 14 is in operation, secondary air forces flap 74 into an open position such that secondary air can be supplied to exhaust manifold 18. However, valve assembly 46 may be any suitable type of valve that enables pump assembly 14 to function as described herein.

Secondary air system 10 may be utilized upon vehicle cold-start to quickly heat one or more after-treatment components 26. In operation, controller 60 operates engine 16 to run rich and subsequently operates secondary air pump assembly 14 to inject secondary air into the cylinder head and/or exhaust manifold 18. Accordingly, the mixture of rich exhaust and secondary air creates an exotherm and ignites the mixture in exhaust gas conduit 20, thereby rapidly heating one or more after-treatment components 26 to a desired or predetermined operating temperature.

During operation of secondary air pump assembly 14, motor 62 rotates impeller 66, which draws air from intake conduit 12 into secondary air intake conduit 28 and subsequently into air inlet 48. As impeller 66 supplies a fixed amount of secondary air with each rotation, position assembly 44 monitors the speed and thus revolutions of shaft 64 and impeller 66. Accordingly, controller 60 may then determine the mass airflow of the secondary air based on the number of revolutions and the known fixed air supply amount. As such, controller 60 may then vary the speed of impeller 66 to provide a desired volume of secondary air through valve assembly 46 and air outlet 50 into secondary air supply conduit 30 where it is subsequently supplied to exhaust manifold 18.

Controller 60 is further configured to determine if the secondary air system 10 is in one or more failure modes such as a low flow indicating a system blockage, a high flow indicating a system leak, and a reverse flow indicating a leak upstream of pump assembly 14. In the exemplary embodiment, controller 60 determines if system 10 is operating in a low flow failure mode by comparing the secondary air flow supply volume determined using position assembly 44 with the oxygen content of the exhaust gas mixture at O2 sensor 72. If the oxygen content is lower at O2 sensor 72 than expected with the determined air flow supply volume, controller 60 indicates a low flow failure mode, which may be caused by a blockage in or around system 10.

Similarly, controller 60 determines is system 10 is operating in a high-flow failure mode by comparing the secondary air flow supply volume with the oxygen content at O2 sensor 72. If the oxygen content is higher at O2 sensor 72 than expected from the determined air flow supply volume, controller 60 indicates a high flow failure mode, which may be caused by a leak in or around system 10.

Controller 60 determines if system 10 is operating in a reverse flow failure mode by monitoring the rotation of target wheel 68 of position assembly 46. If target wheel 68 begins to rotate in a reverse direction, controller 60 indicates a reverse flow failure mode, which may be cause by a leak in or around system 10.

Described herein are systems and methods for a secondary air pump assembly. The pump assembly includes a pump, a position assembly, and a check valve in one convenient package or housing thereby reducing cost and complexity. Thus, a vehicle does not require a separate pump, mass flow sensor, and check valve, as in contemporary secondary air systems.

The described pump assembly includes a brushless DC motor with a target wheel and hall-effect sensor with a positive displacement fan portion of the pump, and a valve to eliminate reverse flow, all packaged within a common housing. The brushless DC motor enables the air pump to be operated for longer durations than conventional systems. This enables new control and diagnostic strategies that require additional air in the exhaust stream during post cold-start conditions, thereby reducing emissions. The target wheel and hall-effect sensor facilitate determining the state of the pump, live control of the pump speed, and the opportunity to run various duty cycles delivering predetermined amounts of air instead of only one flow volume. A positive displacement air fan along with the combination of known engine speed enables predetermined volumes of secondary air to be delivered, thereby resulting in improved diagnoses of the system.

The valve prevents reverse flow that could occur from increased exhaust pressure. However, any reverse flow air that passes the valve would rotate the air pump in reverse, which is sensed by monitoring the position of the pump with the hall-effect sensor. The pump assembly may be integrated into emission control and diagnostic strategies, as discussed above, and may incorporate the use of an upstream and/or downstream oxygen sensor for a final closed-loop measurement to confirm that secondary air leaving the pump has made its way to the exhaust gas stream as intended.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A secondary air pump assembly for a vehicle, the assembly comprising:
    a housing having an air inlet and an air outlet;
    a pump disposed within the housing;
    a position assembly disposed within the housing and configured to monitor a speed of the pump, the position assembly comprising a hall-effect sensor and a target wheel having at least one permanent magnet; and
    a valve assembly disposed within the housing and configured to facilitate preventing a backflow of air into the housing.

2. The secondary air pump assembly of claim 1, wherein the pump is a positive displacement pump.

3. The secondary air pump assembly of claim 2, further comprising a motor assembly operably associated with the positive displacement pump, wherein the motor assembly is disposed within the housing and comprises a motor and a shaft.

4. The secondary air pump assembly of claim 1, wherein the valve assembly comprises a check valve disposed in the air outlet of the housing.

5. A secondary air system for a vehicle, the system comprising:
    an exhaust manifold configured to be coupled to an engine;
    an exhaust gas conduit coupled to the exhaust manifold;
    an air intake conduit configured to supply intake air to the engine;
    a secondary air intake conduit coupled to the air intake conduit; and
    a secondary air pump assembly fluidly coupled to the secondary air intake conduit, the secondary air pump assembly comprising:
        a housing having an air inlet and an air outlet;
        a pump disposed within the housing;
        a position assembly disposed within the housing and configured to monitor a speed of the pump, the position assembly comprising a hall-effect sensor and a target wheel having at least one permanent magnet; and
        a valve assembly disposed within the housing and configured to facilitate preventing a backflow into the housing.

6. The secondary air system of claim 5, wherein the pump is a positive displacement pump.

7. The secondary air system of claim 6, further comprising a motor assembly operably associated with the positive displacement pump, wherein the motor assembly is disposed within the housing and comprises a motor and a shaft.

8. The secondary air system of claim 5, further comprising a controller in signal communication with the secondary air pump assembly, the controller programmed to determine a mass air flow of the pump utilizing the position assembly.

9. The secondary air system of claim 5, wherein the valve assembly comprises a check valve disposed in the air outlet of the housing.

10. The secondary air system of claim 5, further comprising an O2 sensor disposed in the exhaust gas conduit.

* * * * *